United States Patent [19]

Trump

[11] 3,770,970

[45] Nov. 6, 1973

[54] SHAFT ANGLE ENCODER
[75] Inventor: Dennis H. Trump, Chelmsford, Mass.
[73] Assignee: Trump-Ross Industrial Controls, Inc., Billerica, Mass.
[22] Filed: Mar. 15, 1972
[21] Appl. No.: 234,901

[52] U.S. Cl.. 250/231 SE, 250/219 DD, 250/237 G
[51] Int. Cl. .................. G01d 5/34, G01n 21/30
[58] Field of Search .............. 250/231 SE, 219 DD, 250/237 G

[56] References Cited
UNITED STATES PATENTS
3,514,618  5/1970  Seward ......................... 250/231 SE
2,995,705  8/1961  Walker et al .................. 250/231 SE
3,187,187  6/1965  Wingate ........................ 250/231 SE
2,886,717  5/1959  Williamson et al ............. 250/237 G

*Primary Examiner*—Walter Stolwein
*Assistant Examiner*—T. N. Grigsby
*Attorney*—Robert J. Schiller

[57] ABSTRACT

An optical shaft encoder comprising a drum adapted to rotate with the shaft and having light transmissive slots. Light from a source positioned within the drum passes radially through the slots, and is projected upon a slotted stator element positioned outside the drum. A plurality of photoelectric cells, operating as pairs in push-pull, are positioned exterior to the stator element for receiving light beams passing through slots in the stator element and for providing an electrical signal representative of shaft parameters.

15 Claims, 5 Drawing Figures

PATENTED NOV 6 1973  3,770,970
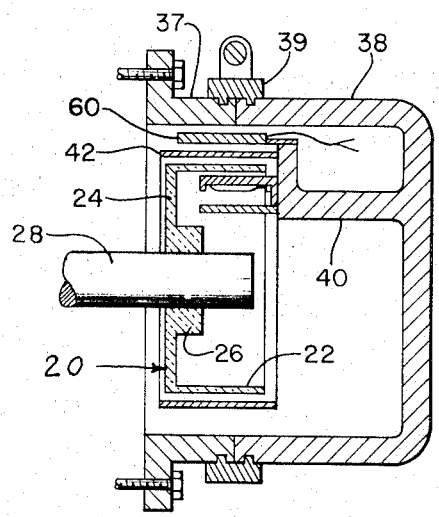
FIG. 1
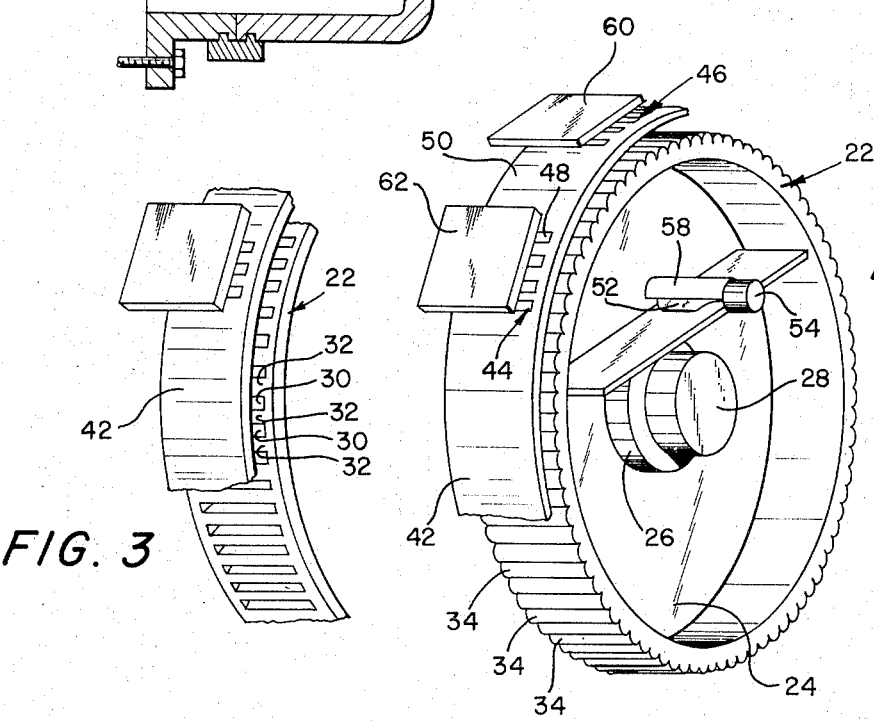
FIG. 2
FIG. 3
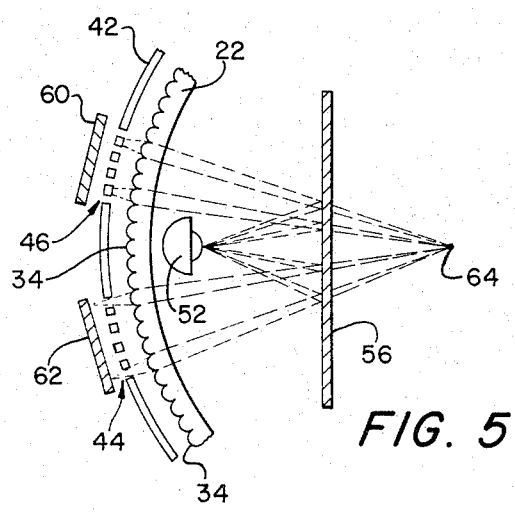
FIG. 5
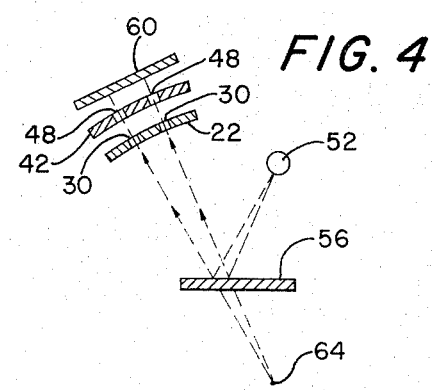
FIG. 4

SHAFT ANGLE ENCODER

The present invention relates to electromechanical transducers and more particularly to photoelectric shaft encoding devices particularly adapted for providing an electrical signal output indicative of angular shaft position, shaft velocity, or the number of revolutions of a rotatable shaft.

Photoelectric shaft encoders are well known in the art and usually are classified as absolute encoders when designed to indicate angular shaft position by a series of mutually unique coded output signals, or incremental encoders when capable of yielding an output signal in the form of a count or train of similar pulses.

Absolute encoders usually employ a plurality of concentric tracks each containing a number of for example, light-opaque and transmissive elements. The tracks are typically encoded to provide a cyclic binary output, hence the number of elements doubles as one progresses from track to track, e.g. for a 16 track and thus a 16 binary bit encoder, the most crowded track must contain $2^{16}$ elements. A detector is provided for reading each track. Clearly, these devices are complex, expensive and do not readily lend themselves to simple, inexpensive applications.

One type of incremental encoder which has been used by the art for less expensive applications than absolute encoders, employs a so-called moire pattern encoding technique and typically includes a pair of encoder discs one of which is rotatably mounted on the shaft and divided into alternate light-transmissive and opaque, equiangular sectors. The other disc is mounted with its center colinear with the axis of the rotatable disc. The second disc is also divided into alternative light-transmissive and opaque equiangular sectors, but one more of each in number than the rotatable disc possesses. Such encoders are exemplified by the devices shown in U.S. Pat. Nos. 3,096,444 and 3,514,618 to H.H. Seward, U.S. Pat. No. 3,412,256 to D.V. Cronin, U.S. Pat. No. 3,400,275 to D.H. Trump and others.

In such prior art incremental encoders, it is usually quite important to carefully collimate the light traversing the discs, and to maintain quite precise disc spacing and disc parallelism, in order to avoid the introduction of errors. These and other requirements for precision may impose costs which make the use of the encoder prohibitively expensive for certain applications. For example, a very large number of stepping motors are used industrially. Typically a standard stepping motor may progress by steps of 1.8° each (200 steps per revolution). To determine the shaft position, it is customary to count the number of pulses given to the stepping motor, but this is an indirect means of shaft position and there is no absolute certainty that in fact the motor has stepped even through a pulse was given to the motor and was counted. It is therefore desirable to provide an encoder which can directly measure shaft position with at least a resolution of less than 1.8 degrees, and which is also quite inexpensive.

A principal object of the present invention is to provide an incremental type of shaft encoder which is particularly well adapted for use in measuring shaft positions with fairly coarse resolution, but which can be made very inexpensively and requires little, if any adjustment and/or maintenance.

Other objects of the present invention are to provide such an incremental shaft encoder which is relatively insensitive to axial end play of a shaft, and which is operable in a substantially increased temperature environment; to provide a photoelectric shaft angle encoder of the type described which includes a minimal number of parts, and is very simple to construct and operate; and to provide a shaft angle encoder of the type described which is particularly well adapted for use with stepping motors.

Generally, to effect the foregoing and other objects the present invention is embodied in a shaft transducer comprising a cylindrical drum having light transmissive elements therein, and adapted to rotate coaxially with a shaft. Positioned within the drum and to one side of the shaft is a light source and means for projecting light from the source as if the latter were located at the axis of the drum. Positioned outside the drum is a stator element provided with at least two arrays of alternatively light opaque and light-transmissive portions so dimensioned and disposed relative to the light transmissive elements of the drum that when one such array is positioned to cooperate with light transmissive elements of drum to provide maximum light transmission therethrough, the other array is positioned to cooperate with other light-transmissive elements to provide minimum light transmission. A plurality of photoelectric transducer means are disposed exterior to the stator element for measuring light passing from the source, through the light transmissive elements of the drum, and through slits in the stator element.

Other objects of the invention will in part be obvious and will in part appear hereinafter. The invention accordingly comprises the apparatus possessing the construction combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 is a schematic cross-section through a side-elevation, partly in fragment, of an exemplary device embodying the principals of the present invention;

FIG. 2 is a perspective view of one embodiment of certain elements of FIG. 1;

FIG. 3 is an enlarged perspective view, showing the relation of one another of certain elements of another embodiment of FIG. 1;

FIG. 4 is a schematic diagram illustrative of the operation of a basic embodiment of the invention; and FIG. 5 is a schematic diagram illustrative of operation of a more complex embodiment of the invention.

Referring now to the drawings there is shown in FIGS. 1 and 2, an embodiment of the invention comprising a circular drum 20 having a cylindrical periphery or rim 22, and radial support member 24 rigidly connecting rim 22 to central hub 26. Hub 26 is centrally apertured to fit upon shaft 28 (the angular position of which is to be determined) so that drum 20 can be fixed to shaft 28 for rotation of rim 22 coaxially with any rotation of the shaft. The periphery of rim 22 of drum 20 is provided with a plurality of light-transmitting elements distributed equiangularly about rim 22. In the fragment of rim 22 shown in FIG. 3, the rim is typically formed of a light-opaque material such as metal or opaque plastic or the like, and the light-transmitting elements are shown as a plurality of openings or slots 30 which are machined, etched or otherwise cut through the rim or are formed intergrally therewith. Slots 30 are shaped substantially with parallel, elongated straight sides to form, for example, rectangular elongated openings all having the same angular dimension, all having their axes of elongation parallel to one another and to the axis of rotation of the drum. The slots, as will be seen, are separated from one another by opaque portions 32 of the rim, the opaque portions each having the same angular width as the slots. It will therefore be apparent that if the rim has n slots, there will be n opaque portions. If one, for example, wishes to provide the rim with 200 equiangularly located slots 30, then each slot will subtend approximately 0.9° of arc in angular width about the surface of rim 22. Alternatively, the rim shown in FIG. 3 can be formed of a transparent material such as glass or a transparent synthetic polymer such as methyl methacrylate or the like, and either the inner or outer cylindrical surface thereof can be painted, printed or otherwise provided with an opaque coat only in the portions which constitute light-opaque portions 32.

In the alternative embodiment of the invention shown in FIG. 2, at least the rim portion of drum 20 is formed of a dimensionally stable, light-transparent material, such as glass or a synthetic polymeric plastic. At least one of the inner and outer cylindrical surfaces of rim 22 of the embodiment of FIG. 2 is provided with a plurality of like lenticular elements 34 which constitute the light-transmitting portions of rim 22. The lenticules are preferably formed on the outer cylindrical surface of rim 22 as anamorphic focusing elements capable of forming an elongated, or slit-like image. The lenticules typically are convex segments of cylinders all having substantially the same angular width and having their cylindrical axes parallel to one another and parallel with the axis of rotation of drum 20 so that the images they form of a common light source are similarly oriented. Alternatively, both the inner and outer periphery of rim 22 can be provided with associated cylindrical segments so as to form a plurality of concavo-convex lenticules, or the outer periphery of drum 22 can be a smooth cylindrical surface and the inner surface provided with a plurality of concave cylindrical segments to provide the desired anamorphic focusing elements. Regardless of the particular form of the lenticules (approximately planoconvex, planoconcave, or concavo-convex) all of the lenses of a given type should exhibit the same focussing properties.

The lenticulated rim shown in FIG. 2 can be formed readily by a number of known techniques. For example, the entire drum can be formed by machining or etching, but preferably, it is formed by casting or other molding techniques in a single step.

The transducer also includes, as shown particularly in FIG. 1, an alignment mount or circular flange 37 which is intended to be fixedly coupled to some body, typically that which supports shaft 28. Flange 37 may be so coupled by any suitable means such as bolts or the like and is intended to be fixedly mounted as a ring coaxially with shaft 28. A cup-like member such as housing 38, dimensioned to mate with flange 37 and to be releasably coupled to the latter as by potentiometer clip 39 is provided. Fixed to or formed integrally with housing 38 is a support or bracket 40 upon which are fixed or mounted a number of other elements. For example, mounted on bracket 40 is stator element 42, typically in the form of a short cylinder of somewhat greater internal diameter than the external diameter of drum 20, or merely a segment of such a cylinder. Stator 42 is so mounted on bracket 40 that when housing 38 is firmly attached to its support, and drum 20 is mounted on shaft 28, the stator is concentric with respect to the drum and shaft.

As shown particularly in FIG. 2, stator 42 is a substantially light opaque element having a first array 44 and a second array 46 of light-transmissive portions. These light-transmissive portions typically are in the form of slits 48. The number of slits in one array is preferably the same as the number in the other array. The slits are substantially rectangular, elongated, light-transmissive portions of the stator, having their axes of elongation parallel to one another and to the axis of rotation of drum 20, and all having the same angular width. Slots 48 are separated by opaque portions of the stator 42 which have the same angular width as slots 48. The angular distance between the elongated axes or center lines of adjacent slots 48 is preferably the same as the angular distance between the elongated center axes of adjacent light-transmitting elements on the rim of drum 20 associated with stator 42. Each array subtends preferably less than 90° of arc and array 44 and 46 are disposed in one common arc or portion of stator 42, which portion is an arc of preferably substantially less than 180°. The arrays are separated from one another by a section 50 which is preferably much greater in width than the width of a slit 48.

Mounted on bracket 40 are means for directing light from a single source (as if that source were disposed on the axis of rotation from drum 20) radially through the slots in drum 20 to a corresponding pair of arrays 44 and 46 in stator 42. To this end, there is included a light source comprising electrical lamp 52, typically an incandescent filament type, mounted in socket 54, the latter in turn being affixed to bracket 40 so that lamp 52 is disposed at a position between the inner periphery of rim 22 and the axis of rotation of the drum. Also mounted on bracket 40 between lamp 52 and the axis of rotation of drum 20 is reflector 56 positioned to reflect light from lamp 52 in a radial direction through the light transmissive portions of rim 22 to arrays 44 and 46. Reflector 56 in its simplest form need be only a plane mirror disposed about halfway between the source and center of rotation of drum 20, the mirror being normal to a drum radius through source 52. Litht source 52 is preferably enclosed partially within an opaque shield 58 which is disposed between the lamp and arrays 44 and 46 so that the only light which can be directed upon the latter must be that which is reflected from reflector 46.

Also mounted on bracket 40 is means, such as photoelectric cells 60 and 62, for sensing any light transmitted through respective arrays 44 and 46. Photocells 60 and 62 typically may be silicon photovoltaic devices or the like.

The operation of the invention can be readily understood with reference to the schematic drawing of FIG. 4 wherein a number of basic elements of device are shown, as simplified fragments. When the drum is mounted on shaft 28, housing 38 is clamped to flange 37 and the latter is firmly affixed to some body so that stator 42 is coaxial with respect to drum 20, it will be seen that light from lamp 52 (as shown in broken lines) is reflected from mirror 56 through light-transmitting portions or slots 30 in rim 22. The light thus reflected from mirrow 56 will be seen to travel along paths which are radial with respect to the curvature of rim 22; the light thus appears to originate at the center of curvature of the drum, shown at 64. It will be appreciated that center 64 of curvature is coincident with the center of rotation of the drum and of shaft 28.

Assuming that rim 22 is positioned by the rotation of shaft 28 so that a number of slots 30 are registered or aligned with slots 48 in stator 42 such that the light reflected from mirror 52 will pass through the registered slots and thereby impinge upon a detector such as cell 60. When those light-transmitting portions in rim 22 are thus aligned with the lignt-transmissive portions in stator 40, the intensity of the light transmitted jointly by the drum and stator, as indicated by the electrical output of cell 60, is at a maximum. If now shaft 28 rotates to a new position where those slots 30 are each radially adjacent an opaque portion of stator 42 lying between slots 48 the intensity of the light falling on cell 60 will be at a minimum. It will be apparent that for the light intensity, as seen by photocell 60, to go from a minimum to a maximum to a minimum, or from a maximum to a minimum to a maximum, it is only necessary for the shaft to rotate through an angle which assuming that the angular width of slots 30 and opaque portions 32 of rim 22 are equal and that the angular distance between the centers of slots 49) then the shaft need only rotate through an angle which is twice the angular width of a slot 30, i.e. the distance between the center lines of two adjacent slots 30. Thus, if drum 20 has n slots 30, the output signal from cell 60 will be a substantially triangular wave form which can be considered as quasi-sinusoidal, with a fundamental frequency of n per revolution of shaft 20.

It will also be appreciated that the spacing and parallelism between the outer cylindrical surface of rim 22 and the inner cylindrical surface of stator 42 are not particularly critical, nor is it necessary to be concerned about obtaining exact collimation of the light, because all of the light used to excite the photocell is radially directed. To obtain radial direction of the light is quite simple and merely requires that the mirror be adjusted so that its reflecting surface lies simply one half the distance between the center of rotation of the drum and the position of the light of lamp filament, be normal to a drum radius through the lamp filament. The adjustment is not particularly critical and can be accomplished by moving either the mirror or the lamp or both.

In addition, it will be apparent that the drum can wander to some extent axially, particularly if the slots in either the stator or drum are shorter axially than those of the drum or stator as the case may be and the ends of the shorter slot are positioned to lie intermediate the ends of the longer slot. It should also be noted that, because the only moving part, the rotor, is mounted upon the shaft the rotation of which is to be determined, no bearings are necessary in the transducer itself, and this is a considerable cost saving.

Referring now to the schematic shown in FIG. 5 it will be appreciated that this in fact is a simplified version of the device of FIG. 2. In FIG. 5, light from lamp 52 is reflected from mirror 56 so that it appears to originate at center 64 which is, of course, coincident with the center of rotation of drum 20. In FIG. 5 rim 22 is transparent and lenticulated as in FIG. 2. Light reflected from mirror 56 in a radial direction with respect to the curvature of rim 22 is essentially focused, as shown in dotted lines by each lenticule to a focal "point" which, in the case of the anamorphic elements is in fact a focal line. Slots 48 in arrays 46 and 44 are spaced apart by the same angular distance as the distance between adjacent focal lines formed by adjacent lenticules 34. The slots of array 44 are arranged with respect to the slots of array 46 so that when all of the focal lines from associated lenticules 34 are focused exactly in the middle of the light transmissive slots of one array, the focal lines from the lenticules associated with the other array fall directly between the slots on the opaque portions of stator 42. It will be obvious then that as drum 20 moves rim 22, the focal lines formed by the lenticules will rotate in conjunction with the drum so that the intensity of illumination falling on one photocell, for example photocell 60 will vary from, for example, maximum to minumum to maximum while the intensity of the light falling upon the other photocell 62 will at the same time vary from a minimum to a maximum to a minimum. Thus it will be seen that the electrical outputs from the two photocells will essentially be 180° out of phase with one another. Consequently, cells 60 and 62, as well known in the art, can be electrically connected to one another in push-pull, thus providing a electrical signal which is essentially double in amplitude with respect to the signal, coming from either of the cells.

As is well known to those skilled in the art, the output signals from the photocells can be readily digitized, as by determining the zero axis crossings. Inasmuch as a drum with n-slots or lenticules will provide an output fundamental frequency of n per shaft revolution, the axis crossing can be used to determine the position of the drum from some arbitrary zero. If means to establish an arbitrary zero position of the drum are desired, the same can be provided through a number of known techniques which do not form a part of the present invention. It is also apparent to those skilled in the art that one or more additional pairs of arrays can be provided in stator 42 to provide, for example four, eight or even more photocell outputs. The use of two pairs of arrays to provide quadrature signals and therefore yield four axis crossings for each rotation of the shaft through a period (rotation through an arc equivalent to the distance from center to center of adjacent light-transmitting portions) will be obvious to those skilled in the art in view of the teaching of the structure herein.

Flange 37 is firmly affixed to a body such as a motor housing to provide essentially a centering jig upon which housing 38 can be mounted simply by tightening potentiometer clip 39. This permits one to rotate housing 38 with respect to the motor housing and thereby to set the relationship or phase or arrays 44 and 46 with respect to some fixed position of the shafts, a particularly useful aspect of the invention when used with stepping motors.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An encoder responsive to rotation of a shaft, and comprising in combination;

a cylindrical drum adapted to be mounted on said shaft for rotation coaxially with said shaft, said drum having a plurality of light-transmitting portions spaced substantially equiangularly about the cylindrical surface of said drum;

a light source disposed within said drum to one side of the axis of rotation of said drum;

a stator element having at least one array of alternately light-transmissive and light-opaque sections, said light-transmissive sections being spaced apart by substantially the same angular increment as said portions of said drum, said element being fixedly disposed with respect to said drum such that upon rotation of said drum said light-transmissive sections are registerable radially with a like number of light-transmitting portions;

means for projecting light from said source radially through a plurality of said light-transmitting portions and hence through those light-transmissive sections; as may be registered with any of said portions; and means for providing an electrical signal responsively to light transmitted through said light-transmitting portions and said light-transmissive sections.

2. An encoder as defined in claim 1 wherein said light-transmitting portions are shaped with a pair of parallel elongated straight sides, disposed with their axes of elongation parallel to one another and to said axis of rotation.

3. An encoder as defined in claim 2 wherein said portions are shaped as elongated, substantially rectangles.

4. An encoder as defined in claim 2 wherein said portions are openings through said surface, the remainder of said surface being opaque.

5. An encoder as defined in claim 1 wherein said light-transmitting portions are lenticular elements.

6. An encoder as defined in claim 5 wherein each of said elements is shaped for focussing light projected from said source as an elongated image, each axis of elongation of each of said images being parallel to the axes of elongation of the others of said images and to said axis of rotation.

7. An encoder as defined in claim 1 wherein said light-transmitting portions are segments of cylindrical lenses all disposed with their cylindrical axes parallel to one another and to said axis of rotation.

8. An encoder as defined in claim 5 wherein at least the rim of said drum is formed substantially of a light-transparent material.

9. An encoder as defined in claim 1 wherein said stator element is at least a segment of a cylinder disposed substantially coaxially with said drum.

10. An encoder as defined in claim 9 wherein said stator element is formed of a substantially light-opaque material and said light-transmissive sections are substantially slotted openings in said material.

11. An encoder as defined in claim 1 wherein said array subtends an angle less than 90° about said drum.

12. An encoder as defined in claim 1 including a second array of alternately light-transmissive and light-opaque sections substantially similar to said first array, said two arrays subtending a total angle less than 180° about said drum.

13. An encoder as defined in claim 12 wherein said two arrays are disposed such that when the joint transmission of light through said portions of said drum and the light-transmissive sections of one of said arrays is at a maximum, the joint transmission of light through said portions and the light transmissive sections of the other of said arrays is at a minimum.

14. An encoder as defined in claim 1 wherein said means for projecting comprises a reflector positioned between said source and said axis of rotation.

15. The encoder as defined in claim 1 wherein said means for projecting comprises a substantially plane reflector positioned approximately halfway between said source and said axis of rotation substantially normally to a radius through said source.

* * * * *

UNITED STATES PATENT OFFICE
CERTIFICATE OF CORRECTION

Patent No. 3,770,970　　　　　　　　　　Dated November 6, 1973

Inventor(s)  Dennis H. Trump

It is certified that error appears in the above-identified patent and that said Letters Patent are hereby corrected as shown below:

Claim 1, line 19 the word "hence" should be --thence--.

Signed and sealed this 23rd day of April 1974.

(SEAL)
Attest:

EDWARD M. FLETCHER, JR.　　　　　　　　C. MARSHALL DANN
Attesting Officer　　　　　　　　　　　　Commissioner of Patents